United States Patent [19]

Kammerl

[11] Patent Number: 5,295,135
[45] Date of Patent: Mar. 15, 1994

[54] ARRANGEMENT FOR MONITORING THE BIT RATE IN ATM NETWORKS

[75] Inventor: Anton Kammerl, Groebenzell, Fed. Rep. of Germany

[73] Assignee: Siemens Aktiengesellschaft, Munich, Fed. Rep. of Germany

[21] Appl. No.: 932,561

[22] Filed: Aug. 20, 1992

[30] Foreign Application Priority Data

Aug. 27, 1991 [EP] European Pat. Off. ........ 91114393.1

[51] Int. Cl.⁵ .................... H04L 12/56; H04J 3/14
[52] U.S. Cl. .................... 370/17; 370/94.1; 370/94.2
[58] Field of Search .......... 370/60, 60.1, 94.1, 370/94.2, 17, 13, 58.1, 58.2, 58.3

[56] References Cited

U.S. PATENT DOCUMENTS

| | | | |
|---|---|---|---|
| 5,007,048 | 4/1991 | Kowalk | 370/60 |
| 5,070,498 | 12/1991 | Kakuma et al. | 370/60 |
| 5,119,367 | 6/1992 | Kawakatsu et al. | 370/60 |

OTHER PUBLICATIONS

International Journal of Digital and Analog Communication Systems, vol. 3, 1990, Gerd Niestegge, "The 'Leaky Bucket' Policing Method in the ATM (Asynchronous Transfer Mode) Network", pp. 187–197.
International Switching Symposium, Session A8, Paper #4, Proceedings vol. V, Erwin P. Rathget et al, "The Policing Function in ATM Networks", pp. 127–130.

*Primary Examiner*—Wellington Chin
*Attorney, Agent, or Firm*—Hill, Steadman & Simpson

[57] ABSTRACT

For dual leaky bucket ATM bit rate monitoring, a peak bit rate is monitored in a first leaky bucket unit and a maximum cell plurality of a full rate burst is defined. A duration of peak rate bursts is monitored in a second leaky bucket unit with a first counter respectively reset to 0 when the counter reading returns below a defined value. An average bit rate is monitored with a further counter having a lower response value that is incremented with a cell rate which is smoothed dependent on a degree of filling in an additional cell counter.

12 Claims, 1 Drawing Sheet

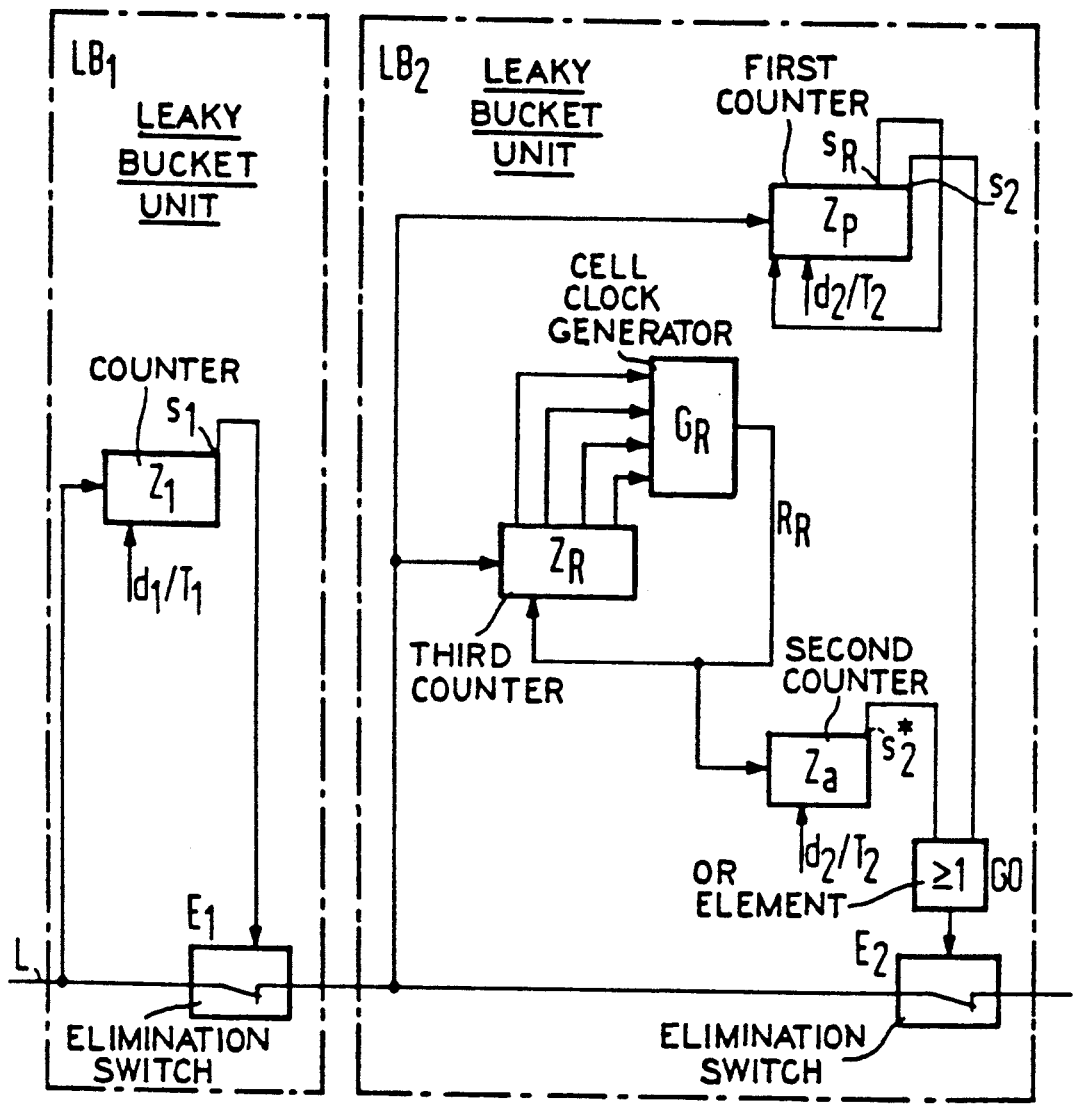

ARRANGEMENT FOR MONITORING THE BIT RATE IN ATM NETWORKS

RELATED APPLICATION

This application is related to a copending application of the same inventor entitled "ARRANGEMENT FOR MONITORING THE BIT RATE IN ATM NETWORKS", U.S. application Ser. No. 07/932,684 and assigned to Siemens AG, the same assignee as the present application.

BACKGROUND OF THE INVENTION

In recent developments of telecommunications technology (and in the development of integrated services broadband networks (B-ISDN) in this case), the asynchronous transfer mode (ATM) based on asynchronous time-division multiplex plays a significant part. The signal transmission therein proceeds in a bit stream that is subdivided into cells (each respectively composed of a header and a useful information part) having a constant length of, for example, 52 octets that are occupied as needed with packeted messages. When no useful information is to be communicated at the moment, then specific dummy cells are transmitted. Virtual connections, i.e. connections that only in fact use a path section when a message packet (block) is in fact to be communicated thereover, are set up in ATM switching centers. The header of every packet contains, among other things, an address covering for example 2 octets, for unambiguous allocation of the packet to a specific virtual connection. Dependent on the technique of the respective selection information, every packet at the input to the switching network can obtain the complete information for its path through the switching network. With the assistance of this information, the switching elements then through-connect the packet on the defined route themselves (self-routing network) (see, for example, Telcom Report 11(1988)6, 210 ... 213), incorporated herein.

An ATM network offers the subscriber an extremely high maximum bit rate $r_{max}$ of, for example, 150 Mbit/s. Only a part of the available bit rate is often utilized by the subscriber dependent on the respective ATM service, namely

- in the form of the constant bit rate $r_c$ (of for example 2 Mbit/s) in what are referred to as CBR (constant bit rate) connections;
- in the form of the average bit rate $r_a$ (of for example 5 Mbit/s) and of the peak bit rate $r_p$ (of for example 30 Mbit/s) in what are referred to as VBR (variable bit rate) connections.

During the call set up, the respectively desired traffic parameters are negotiated and potentially declared. A decision is thereby made in a call acceptance control means as to whether the momentarily available network capacity is adequate in order to set up a desired, virtual connection.

After the set up of the virtual connection, the negotiated traffic parameters are monitored in a bit rate monitoring means (policing unit). When the negotiated value is exceeded, then the excess ATM cells are eliminated. However, it is also possible to mark the excess ATM cells such that they can still be subsequently eliminated in the network as low-priority ATM cells in case traffic jams arise.

The bit rate monitoring usually occurs according to what is referred to as the leaky bucket principle (see, for example, Niestegge, the "Leaky Bucket" Policing Method in the ATM (Asynchronous Transfer Mode) Network, INTERNATIONAL JOURNAL OF DIGITAL AND ANALOG COMMUNICATION SYSTEMS, Vol. 3 (1990), 187 ... 197). At every reception of an ATM cell, the reading of a counter is incremented by one place and (dependent on the negotiated traffic parameters) the counter reading is deincremented by d places at specific intervals T. The counter reading 0 is thereby neither downwardly transgressed nor is a counter reading threshold S upwardly transgressed. When the threshold is reached, the excess ATM cells are eliminated or marked.

When the subscriber adheres to the negotiated bit rate $r = B_z \cdot d/T$, wherein $B_z$ is the plurality of "useful signal" bits per ATM cell, d is the deincrementation value, and T is the deincrementation period, then the counter is always brought back to the counter reading of 0 due to the deincrementation. When the subscriber exceeds the declared bit rate r, then the response threshold s is very quickly reached despite the deincrementation.

Until the response threshold s is reached, the leaky bucket method allows a brief upward transgression of the declared bit rate. Proceeding from the counter reading of 0, thus s ATM cells are first allowed to pass by the leaky bucket unit in an uninterrupted sequence (i.e. without dummy cells or cells belonging to other connections) until the response threshold s of the counter is reached. When the counter reading is deincremented by a value d immediately before this is reached, then a further d ATM cells can pass. When the counter reading has been multiply deincremented before the response threshold s is reached, the plurality of ATM cells allowed to pass increases correspondingly.

The maximum possible plurality of ATM cells referred to as a full-rate burst wherein the maximum bit rate of, for example, 150 Mbit/s occurs is then $n_{max} = s + k \cdot d$ with $k = 1 + \top (s-d)/((T/t_z)-d) \bot$, wherein $t_z$ denotes the duration of an ATM cell at the maximum transmission rate and $\top \ldots \bot$ denotes that only the whole-numbered part of the expression within $\top \ldots \bot$ is relevant.

One job of the bit rate monitoring is to limit the length of such full-rate bursts because full-rate bursts increase the probability of a buffer overflow in the ATM network. For this reason, the response threshold s should be as low as possible.

Given too low a response threshold, on the other hand, it could occur that subscribers that behave properly with respect to the reported bit rate nonetheless have ATM cells eliminated without justification, namely due to waiting time jitter, i.e. variable delays arising in queues.

For example, let a variable delay $\delta$ of, for example, 0.2 ms be permitted in the line circuit area, whereby the transgression probability is allowed to be $10^{-10}$. It follows therefrom that the leaky bucket counter dare not yet have reached the response threshold s after the appearance of this delay. The counter reading of $n = s - 1$ that is just still permissible derives from the ATM cells received in the time span $\delta + T$ in the leaky bucket unit, the plurality of these ATM cells being $d = \delta \cdot r/B_z$. It is thereby then assumed that the counter reading was deincremented to n=0 during the delay time span $\delta$ and that (in the worst case) a deincrementation event occurs immediately before the arrival of the delayed ATM cell bundle. $s = 1 + d + T \delta \cdot r/B_z \bot$ is then valid (also see Niestegge, op. cit. equation (6)). When s is defined in this way, then the probability of an unjustified elimination of ATM cells remains below the value $10^{-10}$. Examples of parameter values r, T, $\delta$, s, $n_{max}$ may be found, for example, in Niestegge, op. cit., Tables I and II.

Proceeding beyond the simple leaky bucket method outlined above, policing methods are currently preferred that make use of what is referred to as a dual leaky bucket principle. For that purpose, a chain of two leaky bucket units is provided, whereby the peak bit rate $r_p = B_z \cdot d_1/T_1$ (with $B_z$ = plurality of bits per ATM cell, $d_1$ = deincrementation value and $T_1$ = deincrementation period of the first leaky bucket unit) is monitored with the first leaky bucket unit and the maximum possible plurality $n_{max} = s_1 + k \cdot d_1$ (with $k = 1 + T(s_1 - d_1)/((T_1/t_z) - d_1)\bot$, $s_1$ = response threshold of the first leaky bucket unit, $t_z$ = duration of an ATM cell at the maximum transmission rate) of ATM cells up to the response of the first leaky bucket unit in what is referred to as a full-rate burst is defined. The average bit rate $r_a = B_z \cdot d_2/T_2$ (with $d_2$ = deincrementation value and $T_2$ = deincrementation period of the second leaky bucket unit) is monitored with the second leaky bucket unit, and the maximum duration $t_{max} \approx s_2 \cdot B_z/(r_p - r_a)$ of a burst with the peak bit rate $r_p$ (peak rate burst) is defined with $s_2$ = response threshold of the second leaky bucket unit) (Niestegge, op. cit., Chapter 4.2).

For these jobs, the second leaky bucket unit must react inertly or, respectively, must work within an extremely high threshold $s_2$. When a service is defined, for example, with $r_a = 2$ Mbit/s, $r_p = 10$ Mbit/s and $t_{max} = 2$ s, then (given $B_z = 48 \cdot 8 = 384$) a value of approximately 40,000 derives for $s_2$. An unallowable increase in the average bit rate $r_a$ to, for example, 2.5 or 3 or 4 or 6 Mbit/s is thereby only recognized extremely late, after 32 or 16 or 8 or 4 s in the example, whereby approximately 40,000 ATM cells too many are transmitted.

What is disadvantageous, on the other hand, is a relatively frequent, unjustified elimination or marking of ATM cells at the $t_{max}$ monitoring. When the bit rate before a bit rate peak remains at the declared value $r_a$ for the average bit rate for a longer time, then the counter of the second leaky bucket unit is held roughly at the counter reading 0 due to the deincrementation. During a bit rate peak of, for example, $r_p = 5 \cdot r_a$ that lasts for approximately the time span $t_{max}$, the response threshold $S_2$ be not quite reached yet. When no ATM cells arrive thereafter for some time, the counter (in a time span of approximately $5 \cdot t_{max}$) will be deincremented to the counter reading 0.

When, however, another (allowed) bit rate peak occurs during this time (on average, at 2.5 $t_{max}$), then the counter starts again (on average at a counter reading $s_2/2$) and then very quickly reaches the response threshold $s_2$ (on average, already after a time span of $t_{max}/2$), with the consequence that $s_2/2$ (i.e., a few thousand) ATM cells are unjustifiably eliminated or marked. The situation becomes even worse when more than 2 bit rate peaks follow one another in a short time.

SUMMARY OF THE INVENTION

It is an object of the invention to avoid the disadvantages recited above.

According to the invention, an arrangement for bit rate monitoring in ATM networks is provided in what is referred to as a dual leaky bucket method. In accordance therewith, the constant bit rate $r_c$ or the peak bit rate $r_p = B_z \cdot d_1/T_1$ (with $B_z$ = plurality of bits per ATM cell, $d_1$ = deincrementation value and $T_1$ = deincrementation period of the first leaky bucket circuit) is monitored with a first leaky bucket unit and the maximum possible plurality $n_{max} = s_1 + k d_1$ (with $k = 1 + T(s_1 - d_1)/((T_1/t_z) - d_1)\bot$, $s_1$ = response threshold of the first leaky bucket unit, $t_z$ = duration of an ATM cell at the maximum transmission rate) of ATM cells up to the response of the first leaky bucket unit in what is referred to as a full-rate burst is defined or the average bit rate $r_a$ equals $B_z \cdot d_2/T_2$ (with $d_2$ = deincrementation value and $T_2$ = deincrementation period of the second leaky bucket unit) is monitored with a second leaky bucket unit and the maximum duration $t_{max} \approx s_2 \cdot B_z/(r_p - r_a)$ of a peak rate burst (with $s_2$ = response threshold of the second leaky bucket unit) is defined. A reset threshold upon whose downward transgression the counter is reset to the counter reading of 0 and that lies shortly before the response threshold is effective in the second leaky bucket unit at the counter having the response threshold $s_2$ that is incremented with the ATM cells arriving in the second leaky bucket unit and is respectively deincremented by the deincrementation value $d_2$ with the deincrementation period $T_2$. In addition to this first counter, an additional counter is provided whose counter reading is incremented with the ATM cells arising in the second leaky bucket unit and is deincremented by a respective counting step with a cell clock rate dependent on the degree of filling. A further counter is likewise respectively deincremented by the deincrementation value $d_2$ with the deincrementation period $T_2$ being simultaneously incremented with the deincrementation of the additional counter. Said further counter has a lower response threshold $S^*_2 < s_2$ than the first counter which, when reached, leads to an elimination or marking of the excess ATM cells in the same way as when the response threshold of the first counter is reached.

The invention offers the advantage in the second leaky bucket unit of being able to take a correspondingly long allowable duration $t_{max}$ of peak rate bursts into consideration with a high response threshold $s_2$ without an unjustified elimination or marking of ATM cells of peak rate bursts following closely upon one another and to also relatively quickly identify an inadmissible upward transgression of the declared average bit rate $r_a$ and to be able to avoid a transmission of excess ATM cells.

In a further development of the invention, the maximum counter reading $Z_{Rmax}$ of the additional counter can be declared in call-associated fashion based on the measure of the parameters provided for the respective connection, particularly proportionally with respect to the response threshold $s$, of the first counter and with respect to the ratio $r_p/r_a$ of the peak bit rate $r_p$ to the average bit rate $r_a$.

In a further development of the invention, the cell clock rate can correspond to the cell rate established at the average bit rate $r_a$ given a small ratio $Z_R/Z_{Rmax}$ of the counter reading with respect to the maximum counter reading of the additional counter.

In a further development of the invention, the cell clock rate (given an increasing ratio of the counter reading with respect to the maximum counter reading of the additional counter) can be boosted above the value of the cell rate established at the average bit rate $r_a$ potentially until (when the maximum counter reading $Z_{Rmax}$ (set in call-associated fashion) is reached) the cell clock rate corresponds to the cell rate established at the peak bit rate $r_p$.

In order to thereby make non-adherence to declared connection parameters more difficult for a subscriber, the counter can be reset to a higher counter reading in a further development of the invention given a repeated downward transgression of the reset threshold effective at the first counter. Given a multiply repeated downward transgression of the reset threshold, the counter can also be reset to respectively increasingly higher counter readings.

BRIEF DESCRIPTION OF THE DRAWINGS

The drawing is a schematic diagram of the system of the invention for monitoring bit rates in ATM networks.

DESCRIPTION OF THE PREFERRED EMBODIMENTS

In a scope necessary for an understanding of the invention, the drawing schematically shows a policing arrangement having a chain of two leaky bucket units $LB_1$, $LB_2$ which, given upward transgression of declared parameters, effect an elimination of excess ATM cells with the assistance of two corresponding elimination means $E_1$, $E_2$ that are shown in the drawing as switches introduced into a line L carrying the ATM cells.

Let the peak bit rate $r_p = B_z \cdot d_1/T_1$ (with $B_z$=plurality of bits per ATM cell, $d_1$=deincrementation value and $T_1$=deincrementation period of the first leaky bucket unit) thereby be monitored with the first leaky bucket unit $LB_1$ and let the maximum possible plurality $n_{max} = s_1 + k \cdot d_1$ (with $k = 1 + T(s_1 - d_1)/((T_1/t_z) - d_1)\bot$, $s_1$ = response threshold of the first leaky bucket unit, $t_z$ = duration of the ATM cell given the maximum transmission rate) of ATM cells up to the response of the first leaky bucket unit be declared in what is referred to as a full-rate burst. For this purpose, it is indicated in the drawing that the first leaky bucket unit $LB_1$ comprises a counter $Z_1$ whose counter reading is incremented by the ATM cells appearing on the cell line L and which is repeatedly deincremented by a respective deincrementation value $d_1$ with a deincrementation period $T_1$ proceeding from a deincrementation input $d_1/T_1$. When the response threshold $s_1$ is reached, the counter $Z_1$ outputs an elimination instruction to the elimination means $E_1$ proceeding from a corresponding output $s_1$.

The average bit rate $r_a = B_z \cdot d_2/T_2$ (with $d_2$=deincrementation value and $T_2$=deincrementation period of the second leaky bucket unit) is monitored with the second leaky bucket unit, and the maximum duration $t_{max} \approx s_2 \cdot B_z/(r_p - r_a)$ of a (so-called peak rate) burst having the peak bit rate is declared (with $s_2$=response threshold of the second leaky bucket unit). For this purpose, it is indicated in the drawing that the second leaky bucket unit $LB_2$ comprises a first counter $Z_p$ whose counter reading is incremented by the ATM cells that still appear on the cell line L after passing the leaky bucket unit $LB_1$ and repeatedly deincremented by a respective deincrementation value $d_2$ with a deincrementation period $T_2$ proceeding from a deincrementation input $d_2/T_2$. When a response threshold $s_2$ is reached, the counter $Z_p$ outputs an elimination instruction to the elimination means $E_2$ proceeding from a corresponding output $s_2$.

As also indicated in the drawing, a reset threshold $s_R$ that lies shortly before the response threshold $s_2$ is effective at the first counter $Z_p$, and the first counter $Z_p$ is reset to the counter reading 0 proceeding from a corresponding output $S_R$ when this reset threshold $s_R$ is downwardly transgressed. It is also possible (given a repeated downward transgression of the reset threshold $s_R$ effective at the counter $Z_p$) that the counter $Z_p$ is not reset to the counter reading 0 but only to a higher counter reading, whereby the counter $Z_p$ can also be reset to respectively increasingly higher counter readings given a multiply repeated downward transgression of the reset threshold $s_R$. Without this being shown in greater detail in the drawing, the reset threshold output $s_R$ of the counter $Z_p$ can also lead to corresponding, additional reset inputs of the counter $Z_p$ for this purpose via a step-by-step means controlled proceeding from the output $s_R$.

The maximum duration $t_{max}$ of peak rate bursts is monitored in the second leaky bucket unit $LB_2$ in the above-recited way with the assistance of the counter $Z_p$.

For monitoring the average bit rate $r_a$, a second counter $Z_a$ is provided in the second leaky bucket unit $LB_2$ in addition to this first counter $Z_p$, this second counter $Z_a$ having a lower response threshold $s_2$ than the first counter $Z_p$. When this lower response threshold $s_2$ is reached, an elimination or marking of the excess ATM cells occurs, in the same way as when the response threshold $s_2$ of the first counter $Z_p$ is reached. For that purpose, it is indicated in the drawing that the corresponding counter output $s_2$ (at the first counter $Z_p$) and $s^*_2$ (at the second counter $Z_a$) leads to the control input of the elimination means $E_2$ via an OR element GO.

As may also be seen from the drawing, the second counter $Z_a$ is repeatedly deincremented by the respective deincrementation value $d_2$ with the deincrementation period $T_2$ proceeding from a corresponding deincrementation input $d_2/T_2$. The counter reading of the second counter $Z_a$ is incremented dependent on the ATM cells arriving in the second leaky bucket unit $LB_2$, and is incremented in the following way.

The lower response threshold $s^*_2$ of the second counter $Z_a$ allows an impermissible increase in the average bit rate $r_a$ to already be recognized correspondingly early. In order to avoid reaching the lower response threshold $s^*_2$ unjustifiably early, those ATM cells that arrive in the further leaky bucket unit $LB_2$ are thereby not directly utilized for incrementing the second counter $Z_a$. On the contrary, a third counter $Z_R$ is also provided, this having its counter reading incremented by the ATM cells arriving in the second leaky bucket unit $LB_2$. This third counter $Z_R$ is respectively deincremented by a counting step with a cell clock rate $R_R$ that is dependent on its degree of filling, i.e. on the counter reading with reference to the maximum counter reading. Simultaneously with every such deincrementation of the third counter $Z_R$, the aforementioned, second counter $Z_a$ is likewise incremented by a counting step. The maximum counter reading $z_{Rmax}$ of the third counter $Z_R$ is defined in call-associated fashion based on the measure of the parameters prescribed for the respective connection, approximately proportionally relative to the response threshold $s_2$ of the first counter $Z_p$ and relative to the ratio $r_p/r_a$ of the peak bit rate $r_p$ with respect to the average bit rate $r_a$. Given, for example, a bit rate ratio $r_p/r_a = 5$, the maximum counter reading can thus be set at $z_{Rmax} = 5\, s_2$.

The cell clock rate $R_R$ can increase with an increasing degree of filling of the third counter $Z_R$, for example in approximately the way to be seen from the following table:

| $Z_R/Z_{Rmax} =$ | $0 \ldots 1/10$ | $1/10 \ldots 1/2$ | $1/2 \ldots 3/4$ | $3/4 \ldots 9/10$ | $9/10 \ldots 1$ |
|---|---|---|---|---|---|
| $R_R =$ | $r_a/B_z$ | $1,2 \cdot r_a/B_z$ | $1,4 \cdot r_a/B_z$ | $1,6 \cdot r_a/B_z$ | $r_p/B_z$ |

Expressed in more general terms, thus the cell clock rate $R_R$ (given an increasing ratio $Z_R/Z_{Rmax}$ of the counter reading to the maximum counter reading of the third counter) is boosted in steps above the value of the cell rate established right at the average bit rate $r_a$ until (when the maximum counter reading $Z_{Rmax}$ set in call-associated fashion is reached, or shortly before that time) finally, the cell clock rate corresponds to the cell rate established at the peak bit rate $r_p$.

For this purpose, it is indicated in the drawing that the respective degree of filling of the third counter $Z_R$ is communicated to a cell clock generator $G_R$ which, in response thereto, outputs a corresponding cell clock via the line $R_R$ to the deincrementation input of the third counter $Z_R$ and to the incrementation input of the afore-mentioned, further counter $Z_a$. For this purpose, the cell clock generator $G_R$ can comprise appropriate cell clock generators that are unlocked dependent on the respective degree of counter filling (without this being shown in detail in the drawing).

The response threshold $s^*_2$ of the afore-mentioned second counter $Z_a$ can, for example, be defined such that it is reached after $4 \cdot t_{max}$ given a bit rate of approximately $1.6 \cdot r_a$. Given $t_{max} = 2$ s and $r_a = 2$ Mbit/s, this is the case given $s^*_2 = 25000$.

In conclusion, let it also be pointed out that both the duration $t_{max}$ of peak rate bursts as well as the average bit rate $r_a$ are monitored in the second leaky bucket unit $LB_2$ in the exemplary embodiment shown in the drawing but that it is also alternatively possible to monitor only the duration $t_{max}$ of peak rate bursts or only the average bit rate $r_a$, whereby (in a modification of the illustration in the drawing) the OR element GO and the counter circuit ($Z_a$ with $Z_R$; $Z_p$) leading to the one or to the other input thereof are then eliminated.

Although various minor changes and modifications might be proposed by those skilled in the art, it will be understood that I wish to include within the claims of the patent warranted hereon all such changes and modifications as reasonably come within my contribution to the art.

I claim as my invention:

1. A system for bit rate monitoring in an ATM network, comprising:

first leaky bucket means for monitoring a constant bit rate $r_c$ or a peak bit rate $r_p = B_z \cdot d_1/T_1$, where $B_z =$ plurality of bits per ATM cell, $d_1 =$ deincrementation value ant $T_1 =$ deincrementation period of the first leaky bucket means, and defining for a fullrate burst a maximum possible plurality $n_{max} = s_1 + kd_1$ of ATM cells up to a response of the first leaky bucket means, where $k = 1 + \top (s_1 - d_1)/((T_1/t_z) - d_1) \bot$, $s_1 =$ response threshold of the first leaky bucket means, and $t_z =$ duration of an ATM cell at a maximum transmission rate;

second leaky bucket means for monitoring an average bit rate $r_a = B_z \cdot d_2/T_2$, where $d_2 =$ deincrementation value and $T_2 =$ deincrementation period of the second leaky bucket means, and defining a maximum duration $t_{max} \approx s_2 \cdot B_z/(r_p - r_a)$ of a peak rate burst where $s_2 =$ response threshold of the second leaky bucket means;

said second leaky bucket means having first, second, and third counter means;

said first counter means having said response threshold $s_2$ and also a reset threshold $s_R$ for resetting the first counter means to zero upon a downward transgression thereof, said reset threshold $s_R$ lying just before said response threshold $S_2$, said response threshold $s_2$ having a counter reading which is incremented with ATM cells arriving in said second leaky bucket means, and being deincremented by said deincrementation value $d_2$ with said deincrementation period $T_2$;

said third counter means also being connected to be incremented with said ATM cells fed to said second leaky bucket means and being deincremented by means for providing a respective counting step with a cell clock rate $R_R$ dependent on a degree of filling of said third counter means;

said second counter means also being connected to be deincremented by said deincrementation value $d_2$ with said deincrementation period $T_2$, and also being connected for being simultaneously incremented with said deincrementation of said third counter means; and said second counter means having a response threshold $s_2^*$ which is lower than the response threshold $s_2$ of said first counter means, either of said $s_2^*$ or $s_2$ response thresholds when reached resulting in an elimination or marking of excess ATM cells.

2. A system according to claim 1 wherein a maximum counter reading $Z_{Rmax}$ of said third counter means being defined in call-associated fashion based on a measure of parameters prescribed for a respective connection.

3. A system according to claim 2 wherein said maximum counter reading $Z_{Rmax}$ is defined proportionally based on said response threshold $s_2$ of said first counter means and based on a ratio of said peak bit rate $r_p$ to said average bit rate $r_a$.

4. A system according to claim 1 wherein said cell clock rate $R_R$, given a small ratio of a counter reading $Z_R$ to a maximum counter reading $Z_{Rmax}$ of said third counter means, corresponds to a cell rate established at said average bit rate $r_a$.

5. A system according to claim 4 wherein said cell clock rate $R_R$, given an increasing ration $Z_R/Z_{Rmax}$ of said counter reading $Z_R$ to said maximum counter reading $Z_{Rmax}$ of said third counter means, is boosted in steps above a value of the cell rate established at said average bit rate $r_a$.

6. A system according to claim 4 wherein, given an increasing ration $Z_R/Z_{Rmax}$ of said counter reading $Z_R$ to said maximum counter reading $Z_{Rmax}$ of said third counter means, said cell clock rate $R_R$ is boosted in steps above a cell rate established at said average bit rate $r_a$ until, and no later than when the maximum counter reading $Z_{Rmax}$ set in call-associated fashion is reached, the cell clock rate $R_R$ corresponding to a cell rate established at the peak bit rate $r_p$.

7. A system according to claim 1 wherein, given a repeated downward transgression of the reset threshold $s_R$ effective at the first counter means, the first counter means is only reset to a higher counter reading.

8. A system according to claim 7 wherein, given a multiply repeated downward transgression of the reset threshold $s_R$, the first counter means is reset to respectively increasingly higher counter readings.

9. A system according to claim 1 wherein only said maximum duration $t_{max}$ of peak rate bursts or the average bit rate $r_a$ is monitored with said second leaky bucket means.

10. A system for bit rate monitoring in an ATM network and for eliminating excess ATM cells, comprising:
   a cell line;
   a first elimination means connected to said cell line which, when activated, eliminates undesired ATM cells;
   a second elimination means in said cell line which, when activated, also eliminates undesired ATM cells from said cell line;
   a first leaky bucket unit means connected to said first elimination means for monitoring a peak bit rate and for defining a maximum cell number of a full rate burst;
   a second leaky bucket means connected to said second elimination means for monitoring a duration of peak rate bursts; and
   said second leaky bucket means having a first counter and means for resetting said first counter to zero when a counter reading thereof downward transgresses a defined response threshold, a second counter means for monitoring an average bit rate and having a response value which is lower than said response value of said first counter, and said second counter means being incremented with a cell rate which is smoothed dependent on a degree of filling in a third cell counter contained in said leaky bucket unit means.

11. A system for bit rate monitoring and for eliminating excess ATM cells in ATM networks, comprising:
   a cell line over with said ATM cells pass and having first and second elimination switches connected in series;
   a first leaky bucket unit containing a counter having an input connected to receive said ATM cells from said cell line, having a further input at which a deincrementation value and a deincrementation period are input, and having a response threshold output connected to trigger said first elimination switch in said cell line; and
   a second leaky bucket unit having said second elimination switch, first, second, and third counters, said first counter connected to receive ATM cells from said cell line at a first input, a second input at which deincrementation signals for a deincrementation by a deincrementation value with a deincrementation period are input, a third input receiving feedback from a first response threshold at a first output, and a second output as a second response threshold connected through a logic element to drive said second elimination switch, said third counter having a first input connected to receive ATM cells from said cell line, a plurality of outputs connected to a cell clock generator means for determining a filling state of said third counter, and an output of the cell clock generator means connected as a feedback input back to a second input of said third counter and also connected through said second counter and through said logic element to said second elimination switch.

12. A system according to claim 11 wherein said second counter has an input connected to receive deincrementation signals for deincrementation with a same deincrementation period and deincrementation value used with said first counter, said logic element comprising an OR gate having first and second inputs and an output, and a response threshold output of the second counter being connected to said first input of said OR gate, said second input of said OR gate connecting to said second response threshold output of said first counter, and said OR gate output connecting to said second elimination switch.

* * * * *